(12) United States Patent
Fackenthal

(10) Patent No.: US 11,256,310 B2
(45) Date of Patent: Feb. 22, 2022

(54) CONFIGURATION UPDATE FOR A MEMORY DEVICE BASED ON A TEMPERATURE OF THE MEMORY DEVICE

(71) Applicant: Micron Technology, Inc., Boise, ID (US)

(72) Inventor: Richard E. Fackenthal, Carmichael, CA (US)

(73) Assignee: Micron Technology, Inc., Boise, ID (US)

( * ) Notice: Subject to any disclaimer, the term of this patent is extended or adjusted under 35 U.S.C. 154(b) by 6 days.

(21) Appl. No.: 16/701,038

(22) Filed: Dec. 2, 2019

(65) Prior Publication Data

US 2020/0174536 A1 Jun. 4, 2020

Related U.S. Application Data

(63) Continuation of application No. 15/289,350, filed on Oct. 10, 2016, now Pat. No. 10,528,099.

(51) Int. Cl.
*G06F 3/06* (2006.01)
*G06F 1/20* (2006.01)

(52) U.S. Cl.
CPC .............. *G06F 1/206* (2013.01); *G06F 3/061* (2013.01); *G06F 3/0634* (2013.01); *G06F 3/0653* (2013.01); *G06F 3/0659* (2013.01); *G06F 3/0679* (2013.01); *G06F 3/0688* (2013.01); *Y02D 10/00* (2018.01)

(58) Field of Classification Search
CPC .......................... G06F 11/3058; G06F 11/3037
See application file for complete search history.

(56) References Cited

U.S. PATENT DOCUMENTS 6,356,488 B1 3/2002 Kang
6,564,288 B2 5/2003 Olarig et al.
(Continued)

FOREIGN PATENT DOCUMENTS

| JP | 2013175252 A | 9/2013 |
|---|---|---|
| KR | 20050044919 A | 5/2005 |
| KR | 20060013806 A | 2/2006 |

OTHER PUBLICATIONS

The Korean Intellectual Property Office, "Notice of Reasons for Rejection," issued in connection with Korean Application No. 10-2019-7012369, dated Jul. 24, 2020 (11 pages).

(Continued)

*Primary Examiner* — Edward J Dudek, Jr.
(74) *Attorney, Agent, or Firm* — Holland & Hart LLP

(57) ABSTRACT

Methods, systems, and devices for operating a ferroelectric memory cell or cells and, more particularly, a temperature update for a memory device are described. A memory array may be operated according to a timing cycle that includes a first interval for performing a first type of operation and a second interval for performing a second type of operation, where a duration of the first interval is greater than a duration of the second type of interval. A temperature related to a temperature of at least a portion of the memory array may be sampled during an interval of the second type, and the memory array may be reconfigured based at least in part on a sampled temperature. The first type of operation may then be performed on a reconfigured memory array during an interval of the first type.

19 Claims, 9 Drawing Sheets

(56) References Cited

U.S. PATENT DOCUMENTS

| | | | |
|---|---|---|---|
| 8,606,991 B2 * | 12/2013 | Sun | G11C 11/40618 |
| | | | 711/106 |
| 9,230,616 B2 | 1/2016 | Luthra et al. | |
| 9,361,029 B2 | 6/2016 | Strasser et al. | |
| 9,367,248 B2 | 6/2016 | Hampel et al. | |
| 9,721,641 B2 | 8/2017 | Bains | |
| 2002/0066047 A1 * | 5/2002 | Olarig | G06F 1/206 |
| | | | 713/323 |
| 2005/0078537 A1 | 4/2005 | So et al. | |
| 2005/0104566 A1 * | 5/2005 | Kim | G11C 5/14 |
| | | | 323/226 |
| 2006/0179333 A1 * | 8/2006 | Brittain | G11C 5/143 |
| | | | 713/320 |
| 2007/0191993 A1 * | 8/2007 | Wyatt | G06F 11/3034 |
| | | | 700/299 |
| 2008/0310068 A1 | 12/2008 | Yabe et al. | |
| 2015/0194191 A1 * | 7/2015 | Luthra | G11C 16/10 |
| | | | 365/191 |
| 2016/0085444 A1 | 3/2016 | Tanzawa | |

OTHER PUBLICATIONS

ISA/KR, International Search Report and Written Opinion of the International Searching Authority, Int'l. Appl. No. PCT/US2017/048647, dated Nov. 27, 2017, Korean Intellectual Property Office, Seo-gu, Daejeon, Republic of Korea, 15 pgs.

Ishiwara, "Recent Progress in FET-type Ferroelectric Memories," IEEE, 2003 (4 pages).

* cited by examiner

CONFIGURATION UPDATE FOR A MEMORY DEVICE BASED ON A TEMPERATURE OF THE MEMORY DEVICE

CROSS REFERENCE

The present application for patent is a continuation of and claims priority to and the benefit of U.S. patent application Ser. No. 15/289,350 by Fackenthal, entitled "CONFIGURATION UPDATE FOR A MEMORY DEVICE BASED ON A TEMPERATURE OF THE MEMORY DEIVCE," filed Oct. 10, 2016, assigned to the assignee hereof, and is expressly incorporated by reference in its entirety herein.

BACKGROUND

The following relates generally to memory devices, and more specifically to temperature updates for memory devices.

Memory devices are widely used to store information in various electronic devices such as computers, wireless communication devices, cameras, digital displays, and the like. Information is stored by programming different states of a memory device. For example, binary devices have two states, often denoted by a logic "1" or a logic "0." In other systems, more than two states may be stored. To access the stored information, the electronic device may read, or sense, the stored state in the memory device. To store information, the electronic device may write, or program, the state in the memory device.

Various types of memory devices exist, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, and others. Memory devices may be volatile or non-volatile. Non-volatile memory, e.g., flash memory, can store data for extended periods of time even in the absence of an external power source. Volatile memory devices, e.g., DRAM, may lose their stored state over time unless they are periodically refreshed by an external power source. A binary memory device may, for example, include a charged or discharged capacitor. A charged capacitor may, however, become discharged over time through leakage currents, resulting in the loss of the stored information. Certain features of volatile memory may offer performance advantages, such as faster read or write speeds, while features of non-volatile memory, such as the ability to store data without periodic refreshing, may be advantageous.

FeRAM may use similar device architectures as volatile memory but may have non-volatile properties due to the use of a ferroelectric capacitor as a storage device. FeRAM devices may thus have improved performance compared to other non-volatile and volatile memory devices. In some cases, a ferroelectric memory device may perform a temperature update, but components involved in this update may introduce noise or create other problems. This problems may disrupt operations of the memory cell or other components, may cause signal instability.

BRIEF DESCRIPTION OF THE DRAWINGS

The disclosure herein refers to and includes the following figures.

DETAILED DESCRIPTION

Figure 1:
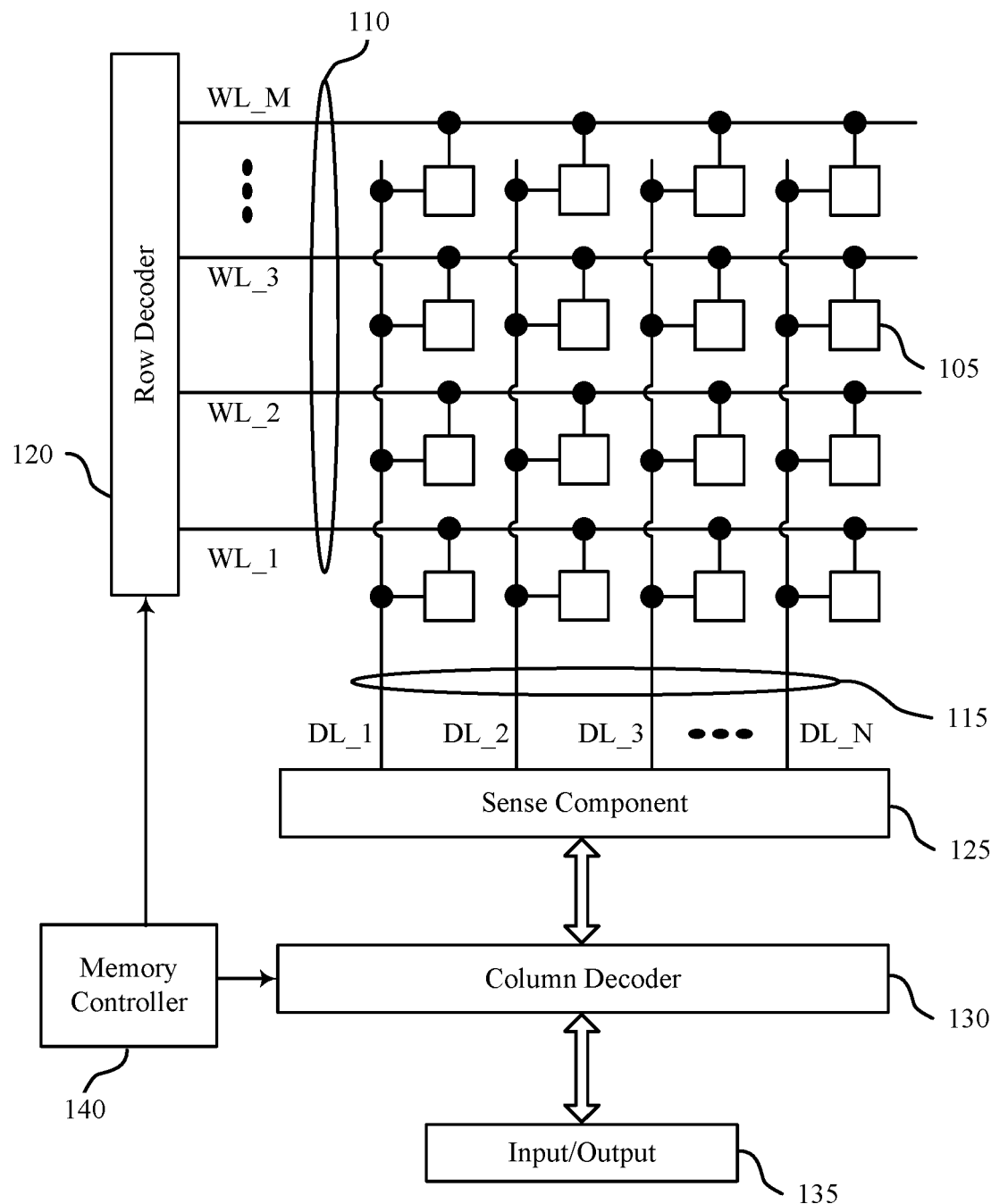
FIG. 1 illustrates an example of a memory array that supports temperature updating for a memory device in accordance with examples of the present disclosure.

A ferroelectric memory device may perform a temperature update to update voltages, power supplies, or other operating characteristics that may change with temperature or other operating parameters. In some examples, components involved in temperature updates during other operations (e.g., a sense operation), however, may introduce noise. This noise may disrupt operations of the memory cell or other components, and may cause instability in signals, including when the temperature is near a switching threshold.

In some examples, during a temperature update, a reference voltage may be changed according to different temperatures. In some cases, a temperature update may occur during at least one other operation (e.g., a sense operation). In some examples, the temperature update of a memory cell may occur during a time interval that prevents or limits distortion of the signal that is discharged by the memory cell or a related component during an operation (e.g., a read operation). For example, the device or a device component may designate a duration to delay or withhold any temperature update while some operations (e.g., critical operations, operations such as writing or reading operations) are performed. During this time, at least a part of (e.g., a subset of) a refresh cycle (e.g., a second type of interval) may be used to access the temperature sensor, sample the temperature, and perform other operations to facilitate a temperature update. In some cases, before sampling the temperature, a settling time may be designated or used to allow the memory cell and/or at least one other component to reconfigure and achieve stable levels.

In some examples, memory devices—such as FeRAM—may contain components that operate with varying characteristics with respect to temperature. In some cases, the memory array or a memory cell may be designed to compensate for temperature to maximize performance and minimize power. For example, at cold temperatures, the voltage of the cell may be increased based on at least one component or operation, while at hot temperatures, the voltage of the cell may be decreased based on at least one component or operation. At cold temperatures, a FeRAM cell may polarize or perform a sense operation at a slower rate. In some cases, in order to regain performance at cold temperatures, the voltage of the cell may be increased. In some cases, sustaining a high voltage circuit may cause the cell to spend more power and energy at higher temperatures.

In some cases, based on the temperature update, the temperature sensor outputs may be used to reconfigure circuits (e.g., high voltage circuits). At higher voltages, the cell may require a small voltage adjustment from a digital-to-analog converter (DAC). In some cases, the cell may require reconfiguration. For example, the cell may be reconfigured to engage a charge pump and supply power to a regulator. In some cases, the charge pump may increase current flow to the regulator for higher voltages if there is not enough headroom for the non-pump power supply. In some applications, the device may perform a temperature update during a predefined interval to reduce power at cold temperatures and avoid higher voltages supplied by the pump.

As described herein, the device may perform a temperature update according to variable latency. For example, instead of increasing the voltage at cold temperatures, the cell may operate with longer latencies at cold temperatures. To notify the system of the latency at a given time, the information may be passed to the system through mode registers. In some cases, the device may initiate a temperature update command to notify the system when the update may occur. The device may perform a temperature update with variable latency to reduce the complexity of adding additional pumps to the die.

Features of the disclosure introduced above are further described below in the context of a memory array. Specific examples are then described for temperature updates for memory devices. These and other features of the disclosure are further illustrated by and described with reference to apparatus diagrams, system diagrams, and flowcharts that relate to temperature updates for memory devices.

FIG. 1 illustrates an example memory array 100 that supports temperature updating for a memory device in accordance with various embodiments of the present disclosure. Memory array 100 may also be referred to as an electronic memory apparatus. Memory array 100 includes memory cells 105 that are programmable to store different states. As described herein, discussion of a cell or a memory cell may apply to a memory cell 105 and/or a memory array 100 unless otherwise described. Each memory cell 105 may be programmable to store two states, denoted as a logic 0 and a logic 1. In some cases, memory cell 105 is configured to store more than two logic states. A memory cell 105 may include a capacitor to store a charge representative of the programmable states; for example, a charged and uncharged capacitor may represent two logic states, respectively. DRAM architectures may commonly use such a design, and the capacitor employed may include a dielectric material with linear electric polarization properties. By contrast, a ferroelectric memory cell may include a capacitor that has a ferroelectric as the dielectric material. Different levels of charge of a ferroelectric capacitor may represent different logic states. Ferroelectric materials have non-linear polarization properties; some details and advantages of a ferroelectric memory cell 105 are discussed below.

Operations such as reading and writing may be performed on memory cells 105 by activating or selecting the appropriate word line 110 and digit line 115. Word lines 110 may also be referred to as access lines and digit lines 115 may also be referred to as bit lines. Activating or selecting a word line 110 or a digit line 115 may include applying a voltage to the respective line. Word lines 110 and digit lines 115 are made of conductive materials. For example, word lines 110 and digit lines 115 may be made of metals (such as copper, aluminum, gold, tungsten, etc.), metal alloys, other conductive materials, or the like. According to the example of FIG. 1, each row of memory cells 105 is connected to a single word line 110, and each column of memory cells 105 is connected to a single digit line 115. By activating one word line 110 and one digit line 115 (e.g., applying a voltage to the word line 110 or digit line 115), a single memory cell 105 may be accessed at their intersection. Accessing the memory cell 105 may include reading or writing the memory cell 105. The intersection of a word line 110 and digit line 115 may be referred to as an address of a memory cell.

According to the techniques described herein, a temperature update may be performed before a read operation that occurs during a first type of interval. Thus, the temperature received by the temperature sensor may accurately reflect the temperature of the memory cell 105. In some cases, if an operation (e.g., a read operation) occurs during the temperature update, the noise may disrupt the operations of the memory cell 105 and may cause instability in a related signal or limit the accuracy of the temperature update operation.

In some architectures, the logic storing device of a cell, e.g., a capacitor, may be electrically isolated from the digit line by a selection component. The word line 110 may be connected to and may control the selection component. For example, the selection component may be a transistor and the word line 110 may be connected to the gate of the transistor. Activating the word line 110 results in an electrical connection or closed circuit between the capacitor of a memory cell 105 and its corresponding digit line 115. The digit line may then be accessed to either read or write the memory cell 105.

Accessing memory cells 105 may be controlled through a row decoder 120 and a column decoder 130. In some examples, a row decoder 120 receives a row address from the memory controller 140 and activates the appropriate word line 110 based on the received row address. Similarly, a column decoder 130 receives a column address from the memory controller 140 and activates the appropriate digit line 115. For example, memory array 100 may include multiple word lines 110, labeled WL_1 through WL_M, and multiple digit lines 115, labeled DL_1 through DL_N, where M and N depend on the array size. Thus, by activating a word line 110 and a digit line 115, e.g., WL_2 and DL_3, the memory cell 105 at their intersection may be accessed.

Upon accessing, a memory cell 105 may be read, or sensed, by sense component 125 to determine the stored state of the memory cell 105. For example, after accessing the memory cell 105, the ferroelectric capacitor of memory cell 105 may discharge onto its corresponding digit line 115. Discharging the ferroelectric capacitor may be based on biasing, or applying a voltage, to the ferroelectric capacitor. The discharging may induce a change in the voltage of the digit line 115, which sense component 125 may compare to a reference voltage (not shown) in order to determine the stored state of the memory cell 105. For example, if digit line 115 has a higher voltage than the reference voltage, then sense component 125 may determine that the stored state in memory cell 105 was a logic 1 and vice versa. Sense component 125 may include various transistors or amplifiers in order to detect and amplify a difference in the signals, which may be referred to as latching. The detected logic state of memory cell 105 may then be output through column decoder 130 as output 135.

A memory cell 105 may be set, or written, by activating the relevant word line 110 and digit line 115. As discussed above, activating a word line 110 electrically connects the corresponding row of memory cells 105 to their respective digit lines 115. By controlling the relevant digit line 115 while the word line 110 is activated, a memory cell 105 may be written—i.e., a logic value may be stored in the memory cell 105. Column decoder 130 may accept data, for example input 135, to be written to the memory cells 105. A ferroelectric memory cell 105 may be written by applying a voltage across the ferroelectric capacitor. This process is discussed in more detail below.

According to the techniques described herein, a temperature update may be performed before or after an operation (e.g., a write operation) that occurs during a first type of interval. Thus, the temperature received by the temperature sensor may accurately reflect the temperature of the memory device. In some cases, if an active operation (e.g., a write operation) occurs during the temperature update, the noise may disrupt the operations of the memory cell 105 and may cause instability in the temperature update.

In some memory architectures, accessing the memory cell 105 may degrade or destroy the stored logic state and re-write or refresh operations may be performed to return the original logic state to memory cell 105. In DRAM, for example, the capacitor may be partially or completely discharged during a sense operation, corrupting the stored logic state. So the logic state may be re-written after a sense operation. Additionally, activating a single word line 110 may result in the discharge of all memory cells in the row; thus, several or all memory cells 105 in the row may need to be re-written. According to techniques described herein, a temperature update may be performed during a refresh cycle or be based on a refresh operation (e.g., a second type of interval). Thus, the device may designate a duration to withhold from temperature updates while the memory cell 105 is performing critical operations.

Some memory architectures, including DRAM, may lose their stored state over time unless they are periodically refreshed by an external power source. For example, a charged capacitor may become discharged over time through leakage currents, resulting in the loss of the stored information. The refresh rate of these so-called volatile memory devices may be relatively high, e.g., tens of refresh operations per second for DRAM arrays, which may result in significant power consumption. With increasingly larger memory arrays, increased power consumption may inhibit the deployment or operation of memory arrays (e.g., power supplies, heat generation, material limits, etc.), especially for mobile devices that rely on a finite power source, such as a battery. As discussed below, ferroelectric memory cells 105 may have beneficial properties that may result in improved performance relative to other memory architectures.

The memory controller 140 may control the operation (e.g., read, write, re-write, refresh, etc.) of memory cells 105 through the various components, such as row decoder 120, column decoder 130, and sense component 125. Memory controller 140 may generate row and column address signals in order to activate the desired word line 110 and digit line 115. Memory controller 140 may also generate and control various voltages used during the operation of memory array 100. In general, the amplitude, shape, or duration of an applied voltage discussed herein may be adjusted or varied and may be different for the various operations for operating memory array 100. Furthermore, one, multiple, or all memory cells 105 within memory array 100 may be accessed simultaneously; for example, multiple or all cells of memory array 100 may be accessed simultaneously during a reset operation in which all memory cells 105, or a group of memory cells 105, are set to a single logic state.

The memory controller 140 may control at least one component to perform the temperature update. In some applications, the memory controller 140 may initiate a command to perform a temperature update. For example, the memory controller 140 may isolate, section out, or lock out portions of the memory array 100 to restrict operations (e.g., critical operations, operations such as sensing or access operations) and access to the memory array 100. In other applications, the temperature update may occur independently of memory controller 140. For example, the memory controller 140 may perform sensing operations during a first interval independent of the temperature update. In some cases, memory controller 140 may adjust a voltage associated with the memory cell 105 during a second period based on the temperature update. For example, critical operations such as sensing or access operations may be restricted during a second period. In some examples, memory control 140 may perform the temperature update of the memory array 100 periodically.

Figure 2:
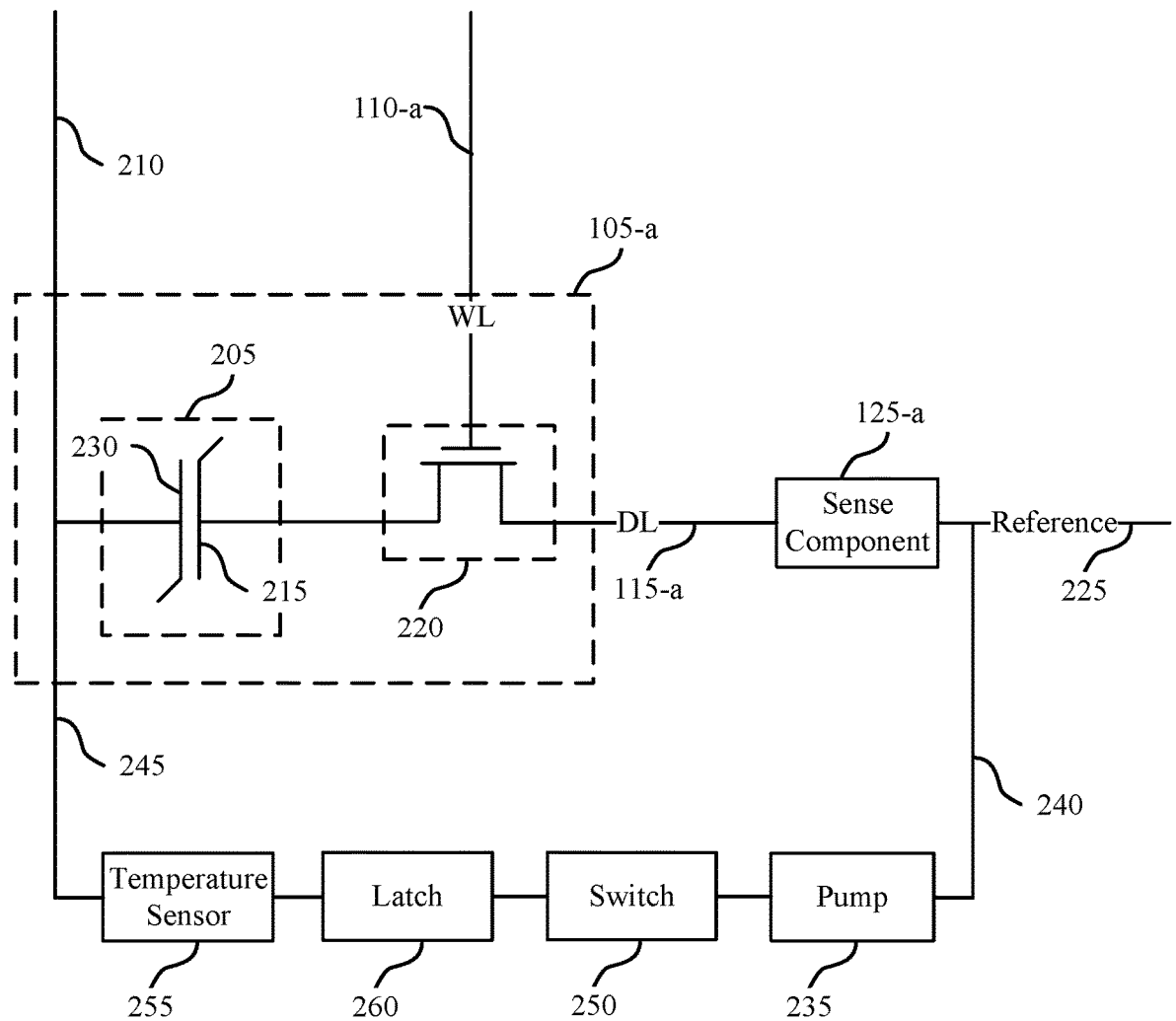
FIG. 2 illustrates an example circuit that supports temperature updating for a memory device in accordance with examples of the present disclosure.

FIG. 2 illustrates an example circuit 200 that supports temperature updating for a memory device in accordance with various embodiments of the present disclosure. Circuit 200 may be an example of memory array 100, includes a memory cell 105-a, word line 110-a, digit line 115-a, and sense component 125-a, which may be examples of a memory cell 105, word line 110, digit line 115, and sense component 125, respectively, as described with reference to FIG. 1. Memory cell 105-a may include a logic storage component, such as capacitor 205 that has a first plate, cell plate 230, and a second plate, cell bottom 215. Cell plate 230 and cell bottom 215 may be capacitively coupled through a ferroelectric material positioned between them. The orientation of cell plate 230 and cell bottom 215 may be flipped without changing the operation of memory cell 105-a. Circuit 200 also includes selection component 220 and reference line 225. Cell plate 230 may be accessed via plate line 210 and cell bottom 215 may be accessed via digit line 115-a. As described above, various states may be stored by charging or discharging capacitor 205.

The stored state of capacitor 205 may be read or sensed by operating various elements represented in circuit 200. Capacitor 205 may be in electronic communication with digit line 115-a. For example, capacitor 205 can be isolated from digit line 115-a when selection component 220 is deactivated, and capacitor 205 can be connected to digit line 115-a when selection component 220 is activated. Activating selection component 220 may be referred to as selecting memory cell 105-a. In some cases, selection component 220 is a transistor and its operation is controlled by applying a voltage to the transistor gate, where the voltage magnitude is greater than the threshold magnitude of the transistor. Word line 110-a may activate selection component 220; for example, a voltage applied to word line 110-a is applied to the transistor gate, connecting capacitor 205 with digit line 115-a.

In other examples, the positions of selection component 220 and capacitor 205 may be switched, such that selection component 220 is connected between plate line 210 and cell plate 230 and such that capacitor 205 is between digit line 115-a and the other terminal of selection component 220. In this embodiment, selection component 220 may remain in electronic communication with digit line 115-a through capacitor 205. This configuration may be associated with alternative timing and biasing for read and write operations.

Due to the ferroelectric material between the plates of capacitor 205, and as discussed in more detail below, capacitor 205 may not discharge upon connection to digit line 115-*a*. In one scheme, to sense the logic state stored by ferroelectric capacitor 205, word line 110-*a* may be biased to select memory cell 105-*a* and a voltage may be applied to plate line 210. In some cases, digit line 115-*a* is virtually grounded and then isolated from the virtual ground, which may be referred to as "floating," prior to biasing plate line 210 and word line 110-*a*. Biasing plate line 210 may result in a voltage difference (e.g., plate line 210 voltage minus digit line 115-*a* voltage) across capacitor 205. The voltage difference may yield a change in the stored charge on capacitor 205, where the magnitude of the change in stored charge may depend on the initial state of capacitor 205— e.g., whether the initial state stored a logic 1 or a logic 0. This may cause a change in the voltage of digit line 115-*a* based on the charge stored on capacitor 205. Operation of memory cell 105-*a* by varying the voltage to cell plate 230 may be referred to as "moving the cell plate."

The change in voltage of digit line 115-*a* may depend on its intrinsic capacitance. That is, as charge flows through digit line 115-*a*, some finite charge may be stored in digit line 115-*a* and the resulting voltage depends on the intrinsic capacitance. The intrinsic capacitance may depend on physical characteristics, including the dimensions, of digit line 115-*a*. Digit line 115-*a* may connect many memory cells 105 so digit line 115-*a* may have a length that results in a non-negligible capacitance (e.g., on the order of picofarads (pF)). The resulting voltage of digit line 115-*a* may then be compared to a reference (e.g., a voltage of reference line 225) by sense component 125-*a* in order to determine the stored logic state in memory cell 105-*a*. Other sensing processes may be used.

Sense component 125-*a* may include various transistors or amplifiers to detect and amplify a difference in signals, which may be referred to as latching. Sense component 125-*a* may include a sense amplifier that, during a sense operation, receives and compares the voltage of digit line 115-*a* and reference line 225, which may be a reference voltage. According to the techniques described herein, a temperature update may occur before or after a sense operation to limit noise that may otherwise be introduced into the signal and cause instability. The sense amplifier output may be driven to the higher (e.g., a positive) or lower (e.g., negative or ground) supply voltage based on the comparison. For instance, if digit line 115-*a* has a higher voltage than reference line 225, then the sense amplifier output may be driven to a positive supply voltage. In some cases, the sense amplifier may additionally drive digit line 115-*a* to the supply voltage. Sense component 125-*a* may then latch the output of the sense amplifier and/or the voltage of digit line 115-*a*, which may be used to determine the stored state in memory cell 105-*a*, e.g., logic 1. Alternatively, if digit line 115-*a* has a lower voltage than reference line 225, the sense amplifier output may be driven to a negative or ground voltage. Sense component 125-*a* may similarly latch the sense amplifier output to determine the stored state in memory cell 105-*a*, e.g., logic 0. The latched logic state of memory cell 105-*a* may then be output, for example, through column decoder 130 as output 135 with reference to FIG. 1.

To write memory cell 105-*a*, a voltage may be applied across capacitor 205. Various methods may be used. In one example, selection component 220 may be activated through word line 110-*a* in order to electrically connect capacitor 205 to digit line 115-*a*. A voltage may be applied across capacitor 205 by controlling the voltage of cell plate 230 (through plate line 210) and cell bottom 215 (through digit line 115-*a*). To write a logic 0, cell plate 230 may be taken high, that is, a positive voltage may be applied to plate line 210, and cell bottom 215 may be taken low, e.g., virtually grounding or applying a negative voltage to digit line 115-*a*. The opposite process is performed to write a logic 1, where cell plate 230 is taken low and cell bottom 215 is taken high.

In some examples, the memory array 100 may be reconfigured in one or more ways based on one or more operations. In some cases, the memory array 100 may be reconfigured based on engaging a charge pump 235 related to or based on a condition. For example, the charge pump 235 may be activated or initiated when a first voltage (e.g., the output voltage 240) is less than a second voltage (e.g., the supply voltage 245) of the memory cell 105-*a*. In some cases, a first voltage (e.g., the output voltage 240), may be an example of an adjusted voltage. The charge pump 235 may be activated or initiated to increase current flow to a regulator based at least in part on the adjusted voltage. Additionally or alternatively, the charge pump 235 may be activated or initiated based on a timing or a type of one or more other operations occurring during an interval. In some cases, the charge pump 235 may be in electronic communication with a switch 250. Switch 250 may be turned on and off which may introduce noise into the signal and discontinuity in the output voltage 240. In some cases, there may not be enough headroom to run a regulator. Based on this, the memory array 100 may activate a charge pump 235 to increase current flow to a regulator. For example, a charge pump 235 may be selectively activated based on a detected temperature (e.g., when a temperature falls below a threshold) to limit noise that may otherwise be introduced into the signal and cause discontinuity in the output voltage 240.

In some cases, the memory array 100 may perform a temperature update based on sampling a temperature in a temperature sensor 255. For example, temperature sensor 255 may be capable of measuring one or more parameters (e.g., electrical parameters) of the memory array 100 (e.g., heat sensor, digital sensor, analog sensor). Some examples of the temperature sensor 255 may include, but are not limited to, a thermistor (e.g., a Negative Temperature Coefficient (NTC) thermistor, a Resistance Temperature Detector (RTD), a thermocouple, a semiconductor based sensor, a contact temperature sensor, a non-contact temperature sensor, another type, a combination of two or more sensor types). In some embodiments, one or more temperature sensors 255 may sample the temperature of the memory cell 104, a portion of the memory array, or some combination. The temperature sensor 255 may be in electronic communication with the memory cell 105-*a*, a counter (not shown), a latch 260, other components, or some combination. The counter may determine an interval of the second type based at least in part on a predetermined interval cycle. In some cases, the counter may identify the beginning of a temperature update (e.g., every Nth "stolen" refresh interval). The latch 260 may receive and store the temperature associated with the temperature sensor 255. Based on this, the temperature sensor 255 may output a digital value corresponding to the temperature. In some cases, the temperature sensor 255 may initiate or activate (e.g., unlocking, opening) a latch 260 and allow the outputted value corresponding to the current temperature of the memory cell 105-*a* to drive the look-up table during a temperature update. For example, the look-up table may further include an array of slots (e.g. different temperature ranges) that serves as an address for the outputted value corresponding to the current temperature of the memory cell 105-*a*. The look-up table may output a digital-to-analog converter (DAC) value that corresponds to a voltage. In some examples, a DAC value may be updated with a temperature change. For example, accessing a value in a look-up table based on the sampled temperature, and/or adjusting a DAC value based on the DAC value and the sampled temperature may update the analog circuit and reconfigure the memory array 100. In some cases, a temperature update may initiate activating (e.g., locking, closing) latch 260 and limit or prevent further temperature update operations or additional updates. In some examples, the switch 250 may respond to the value stored in the latch 260. Based on this, the temperature update may occur during a predefined interval (e.g., a second type of interval).

Figure 3:
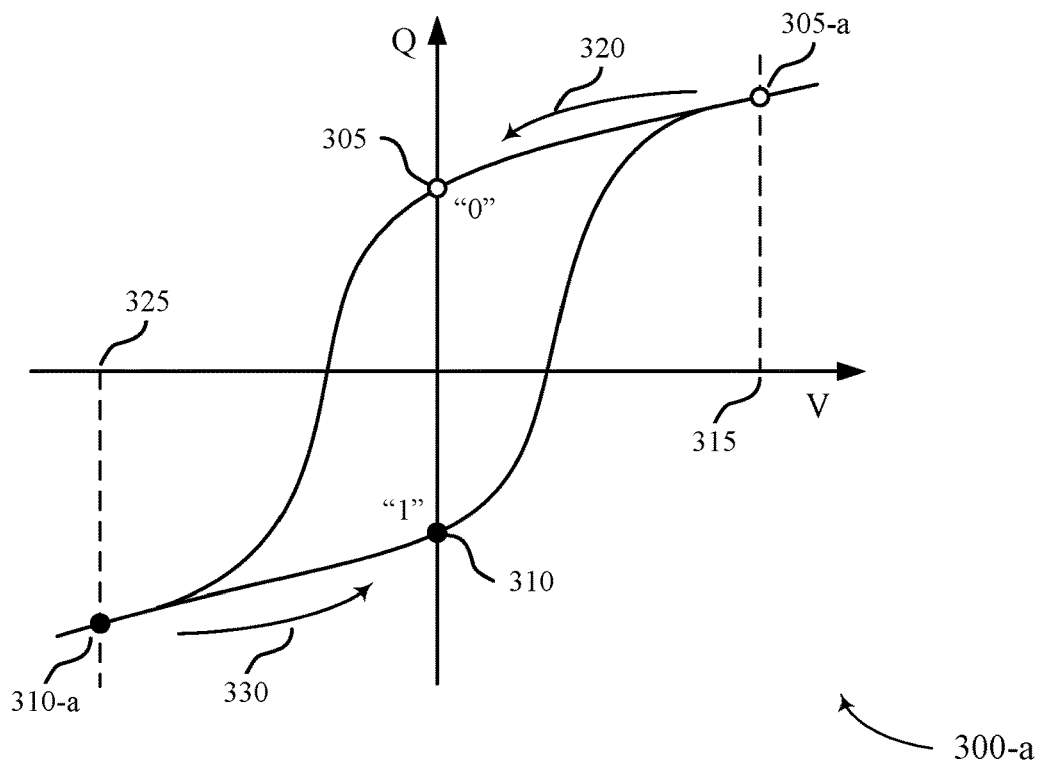
FIG. 3 illustrates an example of a hysteresis plot for a ferroelectric memory cell that supports temperature updating for a memory device in accordance with examples of the present disclosure.
Figure 3:
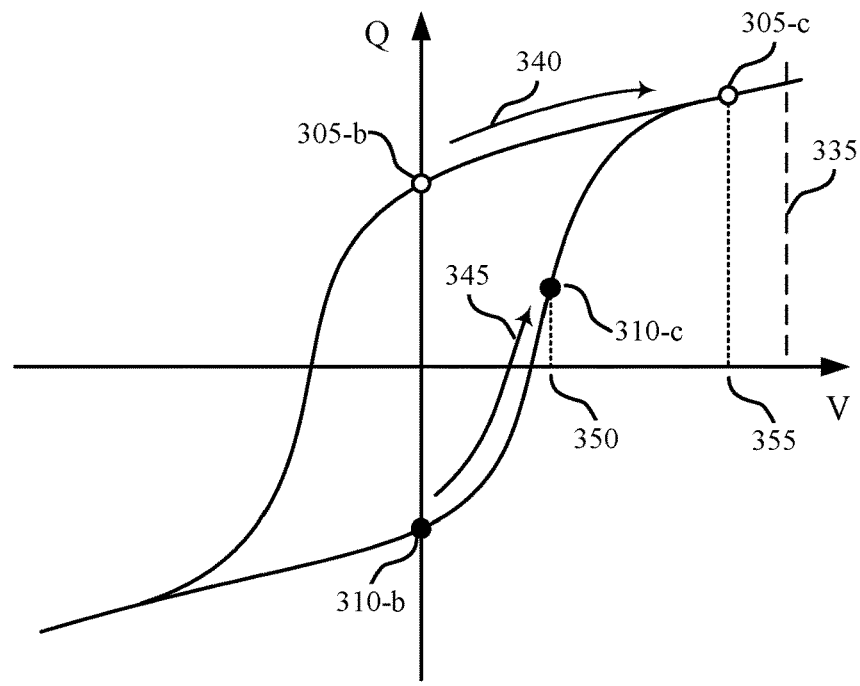

FIG. 3 illustrates an example of non-linear electrical properties with hysteresis curves 300-*a* and 300-*b* for a ferroelectric memory cell that is operated in accordance with various embodiments of the present disclosure. Hysteresis curves 300-*a* and 300-*b* illustrate an example ferroelectric memory cell writing and reading process, respectively. Hysteresis curves 300 depict the charge, Q, stored on a ferroelectric capacitor (e.g., capacitor 205 of FIG. 2) as a function of a voltage difference, V.

A ferroelectric material is characterized by a spontaneous electric polarization, i.e., it maintains a non-zero electric polarization in the absence of an electric field. Example ferroelectric materials include barium titanate (BaTiO3), lead titanate (PbTiO3), lead zirconium titanate (PZT), and strontium bismuth tantalate (SBT). The ferroelectric capacitors described herein may include these or other ferroelectric materials. Electric polarization within a ferroelectric capacitor results in a net charge at the ferroelectric material's surface and attracts opposite charge through the capacitor terminals. Thus, charge is stored at the interface of the ferroelectric material and the capacitor terminals. Because the electric polarization may be maintained in the absence of an externally applied electric field for relatively long times, even indefinitely, charge leakage may be significantly decreased as compared with, for example, capacitors employed in DRAM arrays. This may reduce the need to perform refresh operations as described above for some DRAM architectures.

Hysteresis curves 300 may be understood from the perspective of a single terminal of a capacitor. By way of example, if the ferroelectric material has a negative polarization, positive charge accumulates at the terminal. Likewise, if the ferroelectric material has a positive polarization, negative charge accumulates at the terminal. Additionally, it should be understood that the voltages in hysteresis curves 300 represent a voltage difference across the capacitor and are directional. For example, a positive voltage may be realized by applying a positive voltage to the terminal in question (e.g., a cell plate 230) and maintaining the second terminal (e.g., a cell bottom 215) at ground (or approximately zero volts (0V)). A negative voltage may be applied by maintaining the terminal in question at ground and applying a positive voltage to the second terminal—i.e., positive voltages may be applied to negatively polarize the terminal in question. Similarly, two positive voltages, two negative voltages, or any combination of positive and negative voltages may be applied to the appropriate capacitor terminals to generate the voltage difference shown in hysteresis curves 300.

As depicted in hysteresis curve 300-*a*, the ferroelectric material may maintain a positive or negative polarization with a zero voltage difference, resulting in two possible charged states: charge state 305 and charge state 310. According to the example of FIG. 3, charge state 305 represents a logic 0 and charge state 310 represents a logic 1. In some examples, the logic values of the respective charge states may be reversed to accommodate other schemes for operating a memory cell.

A logic 0 or 1 may be written to the memory cell by controlling the electric polarization of the ferroelectric material, and thus the charge on the capacitor terminals, by applying voltage. For example, applying a net positive voltage 315 across the capacitor results in charge accumulation until charge state 305-*a* is reached. Upon removing voltage 315, charge state 305-*a* follows path 320 until it reaches charge state 305 at zero voltage potential. Similarly, charge state 310 is written by applying a net negative voltage 325, which results in charge state 310-*a*. After removing negative voltage 325, charge state 310-*a* follows path 330 until it reaches charge state 310 at zero voltage. Charge states 305-*a* and 310-*a* may also be referred to as the remnant polarization (Pr) values, i.e., the polarization (or charge) that remains upon removing the external bias (e.g., voltage). The coercive voltage is the voltage at which the charge (or polarization) is zero.

To read, or sense, the stored state of the ferroelectric capacitor, a voltage may be applied across the capacitor. In response, the stored charge, Q, changes, and the degree of the change depends on the initial charge state—i.e., the final stored charge (Q) depends on whether charge state 305-*b* or 310-*b* was initially stored. For example, hysteresis curve 300-*b* illustrates two possible stored charge states 305-*b* and 310-*b*. Voltage 335 may be applied across the capacitor as discussed with reference to FIG. 2. In other cases, a fixed voltage may be applied to the cell plate and, although depicted as a positive voltage, voltage 335 may be negative. In response to voltage 335, charge state 305-*b* may follow path 340. Likewise, if charge state 310-*b* was initially stored, then it follows path 345. The final position of charge state 305-*c* and charge state 310-*c* depend on a number of factors, including the specific sensing scheme and circuitry.

In some cases, the final charge may depend on the intrinsic capacitance of the digit line connected to the memory cell. For example, if the capacitor is electrically connected to the digit line and voltage 335 is applied, the voltage of the digit line may rise due to its intrinsic capacitance. So a voltage measured at a sense component may not equal voltage 335 and instead may depend on the voltage of the digit line. The position of final charge states 305-*c* and 310-*c* on hysteresis curve 300-*b* may thus depend on the capacitance of the digit line and may be determined through a load-line analysis—i.e., charge states 305-*c* and 310-*c* may be defined with respect to the digit line capacitance. As a result, the voltage of the capacitor, voltage 350 or voltage 355, may be different and may depend on the initial state of the capacitor.

By comparing the digit line voltage to a reference voltage, the initial state of the capacitor may be determined. The digit line voltage may be the difference between voltage 335 and the final voltage across the capacitor, voltage 350 or voltage 355—i.e., (voltage 335–voltage 350) or (voltage 335–voltage 355). A reference voltage may be generated such that its magnitude is between the two possible voltages of the two possible digit line voltages in order to determine the stored logic state—i.e., if the digit line voltage is higher or lower than the reference voltage. For example, the reference voltage may be an average of the two quantities, (voltage 335–voltage 350) and (voltage 335–voltage 355). Upon comparison by the sense component, the sensed digit line voltage may be determined to be higher or lower than the reference voltage, and the stored logic value of the ferroelectric memory cell (i.e., a logic 0 or 1) may be determined.

As discussed above, reading a memory cell that does not use a ferroelectric capacitor may degrade or destroy the stored logic state. A ferroelectric memory cell, however, may maintain the initial logic state after a read operation. For example, if charge state 305-b is stored, the charge state may follow path 340 to charge state 305-c during a read operation and, after removing voltage 335, the charge state may return to initial charge state 305-b by following path 340 in the opposite direction.

In some cases, voltage 350 or voltage 355 may not accurately represent the charge stored at or other operating characteristic related to a memory cell 105. For example, if uncompensated, variations in the output voltage 240 related to various components involved in a temperature update may result in variations in voltage 350 or voltage 355, which may in turn lead to operation errors (e.g., read errors). As described herein, in some examples, the variation in output voltage 240 may be accounted for by using a charge pump 235 to achieve an output voltage 240 higher than the supply voltage 245.

Figure 4:
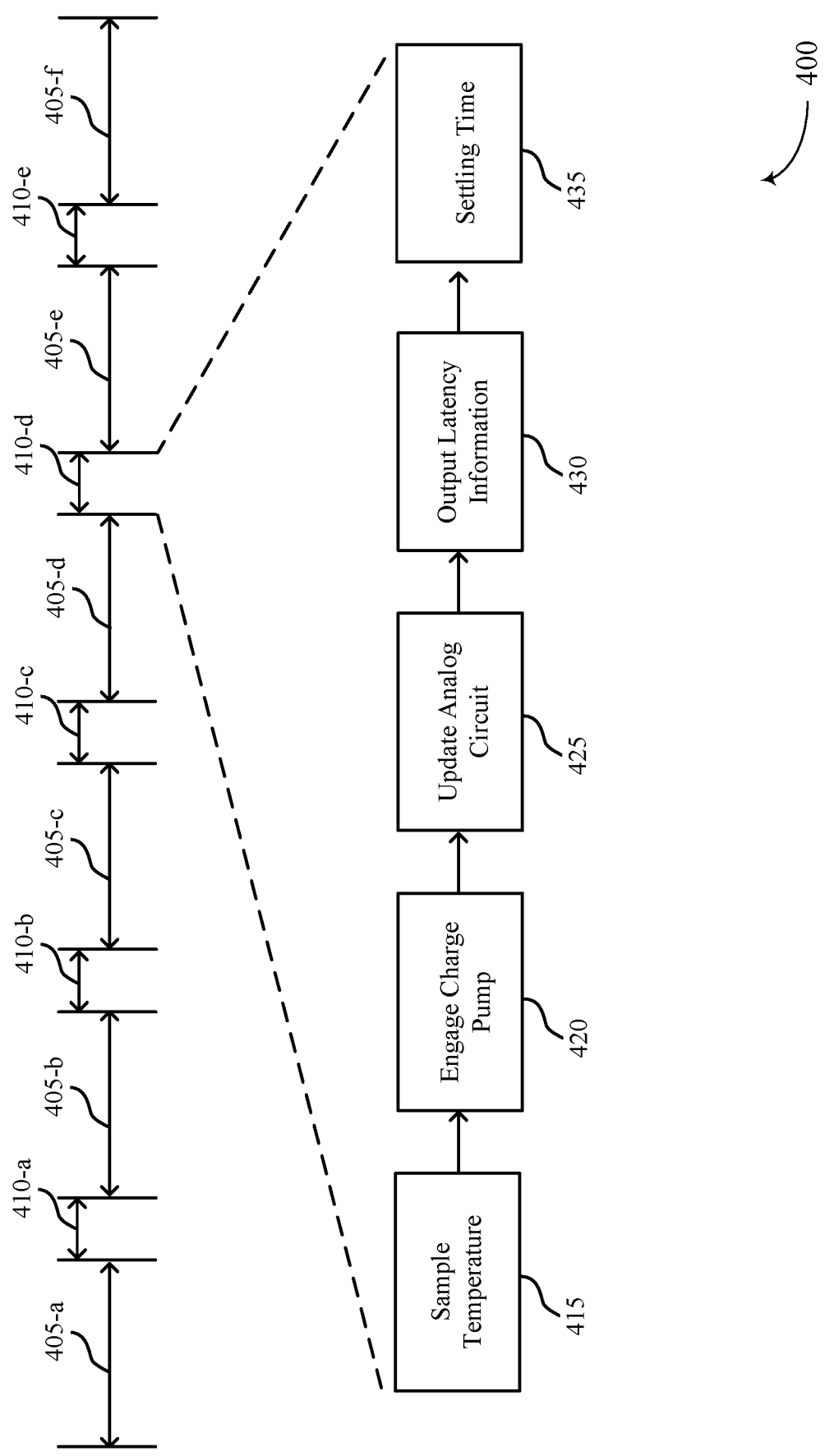
FIG. 4 illustrates an example of a timing cycle that supports temperature updating for a memory device in accordance with examples of the present disclosure.

FIG. 4 illustrates an example of a timing cycle 400 that supports temperature updating for a memory device. Timing cycle 400 may include a first interval 405 (which may be an interval of a first type) and a second interval 410 (which may be an interval of a second type). In some examples, during the first interval 405-d, one or more memory operations (e.g., access operations) related to a memory array 100 or a memory cell 105 may be performed. For example, a read operation related to the memory array 100 or a memory cell 105 may be performed, a write operation related to the memory array 100 or a memory cell 105 may be performed, an operation activating one or more components (e.g., activating sense component 125) related to the memory array 100 or a memory cell 105 may be performed, or a precharging operation related to a component of the memory array 100 may be performed.

In some examples, during the second interval 410-d, the temperature sensor 255 may measure the temperature based on an electrical response of the memory array 100. In some cases, based on a refresh operation, the memory cell 105 may be refreshed during the second interval 410-d. In some examples, the first interval 405-d may be of a first type and the second interval 410-d may be of a second type that is different from the first type. In some cases, the first interval 405-d may be an active operation interval such as an access operation, a write operation, a read operation, activating a sense component, precharging a component, another operation, or a combination thereof, and the second interval 410-d may include a refresh operation, a sampling operation, another operation, or a some combination thereof.

As described herein, the second interval 410-d may, in some examples, occur according to a predetermined interval cycle or schedule. The predetermined interval cycle may be determined based on frequency of memory array 100 usage, operations, disturbances, other characteristics, or some combination related to the memory array 100 or a memory cell 105. During the second interval 410-d, operations that may occur in the first interval 405-d may be prohibited during or delayed for at least a part of the second interval 410-d. For example, the temperature may be measured based on an electrical response from the memory array 100 during a first part of the second interval 410-d, as referenced in block 415. In some cases, the temperature may be resampled from a portion of the memory array 100 or the memory cell 105 after an initial sampling. In some cases, the controller may isolate portions of the memory array 100 to resample a temperature from a portion of the memory array 100. In some examples, the resampling may occur during a subsequent part of the same second interval 410-d. In some examples, the resampling may occur during a subsequent interval of the same type (e.g., second interval 410-e), a subsequent interval of a different type (e.g., first interval 405-e), or some combination. In some examples, performing a temperature update according to a predetermined interval cycle may account for temperature variations independent of performed or scheduled operations or the memory controller 140.

In some examples, multiple temperature updates may occur during intervals of the same type, different types, or some combination. For example, a first temperature update may occur during second interval 410-d and a second temperature update may occur during another interval of a same type (e.g., second interval 410-e). Other variations are also contemplated. In some cases, a first temperature update may occur during second interval 410-d and a second temperature update may occur during the same interval of the same type (e.g., second interval 410-d). In some examples, at least some first intervals (e.g., first interval 405-a, first interval 405-b) may be of a same type, of different types, have the characteristics, may relate to the same or different operations performed during the first intervals, or some combination. In some examples, some second intervals (e.g., second interval 410-a, second interval 410-b) may be of a same type, of different types, have the characteristics, may relate to the same or different operations performed during the first intervals, or some combination.

In some cases, the memory array 100 may be configured according to a voltage configuration (e.g., a high voltage configuration). For example, a charge pump 235 may be enabled for operation at the sampled temperature, as illustrated in block 420. The charge pump 235 may be engaged when the output voltage 240 of the memory cell 105 is less than the supply voltage 245 of the memory cell 105. For example, the memory array 100 may engage a charge pump 235 to increase current flow to a regulator. To engage the charge pump 235, switch 250 may regulate an operating state of the charge pump 235 (e.g., regulate on state, operating state, off state). Switching the charge pump 235 on and off may introduce noise into the signal and discontinuity in the output voltage 240.

As referenced herein at block 425, reconfiguring the memory array 100 may, in some examples, include updating an analog circuit. To perform a temperature update, a temperature sensor 255 may be in electronic communication with the memory cell 105 or the memory array. For example, temperature sensor 255 may be capable of measuring electrical parameters of the memory array 100 (e.g., heat sensor, digital sensor, analog sensor, etc.). In some cases, the temperature sensor 255 may also be in electronic communication with a counter, a latch 260, other components, or some combination. The counter may determine an interval of the second type based at least in part on a predetermined interval cycle. In some cases, the counter may identify the beginning of a temperature update (e.g., every Nth "stolen" refresh interval). In some cases, the latch 260 may receive and store the temperature associated with the temperature sensor 255. In some cases, the temperature sensor 255 may output a digital value corresponding to the current temperature of the memory cell 105. For example, the digital value may drive the look-up table and output a digital-to-analog converter (DAC) value that corresponds to a voltage. In some examples, a DAC value may be updated with a temperature change. For example, updating the analog circuit may occur on a die-by-die basis (e.g., based on the voltage that corresponds to the outputted DAC value). Updating the analog circuit may include accessing a value in a look-up table based on the sampled temperature, and/or adjusting a DAC value based on the DAC value and the sampled temperature. In some cases, discontinuities associated with the temperature change may cause instability on the output voltage 240.

Additionally or alternatively, the memory array 100 may be reconfigured as referenced in block 430 based on latency information. For example, memory array 100 (or a related component) may output latency information to the controller via the mode register. The memory array 100 may run with variable latencies with respect to temperature. For example, latency information may affect a first duration of the second interval 410-d relating to a temperature at or below a threshold (e.g., colder temperatures), or a second duration based on a temperature at or above threshold (e.g., hotter temperatures). In some cases, the output latency information may be passed to the system through mode registers to notify the system of the latency at a given time. In some cases, the memory array 100 may initiate a command (e.g., a temperature update command, scheduling command) to notify the system when the update may occur and other information. For example, the memory array 100 may issue a first temperature update command, read the mode register, and run at the given variable latency until a predetermined time which may be based on the memory array 100 issuing a second temperature updated command. In some applications, the interval may be set aside for a refresh operation and used for temperature sampling. In some cases, the memory device may perform a temperature update periodically (e.g., every Nth "stolen" refresh interval). For example, a temperature update may occur every 5 ms in which 'N' equals 16, a first duration of the first interval 405-d is 300 us, and a first duration of the second interval 410-d is 30 ns. Additionally or alternatively, as described in block 435, a settling time may be used to allow the memory array 100 to reconfigure and achieve stable levels before operations begin in the first interval 405-d.

Figure 5:
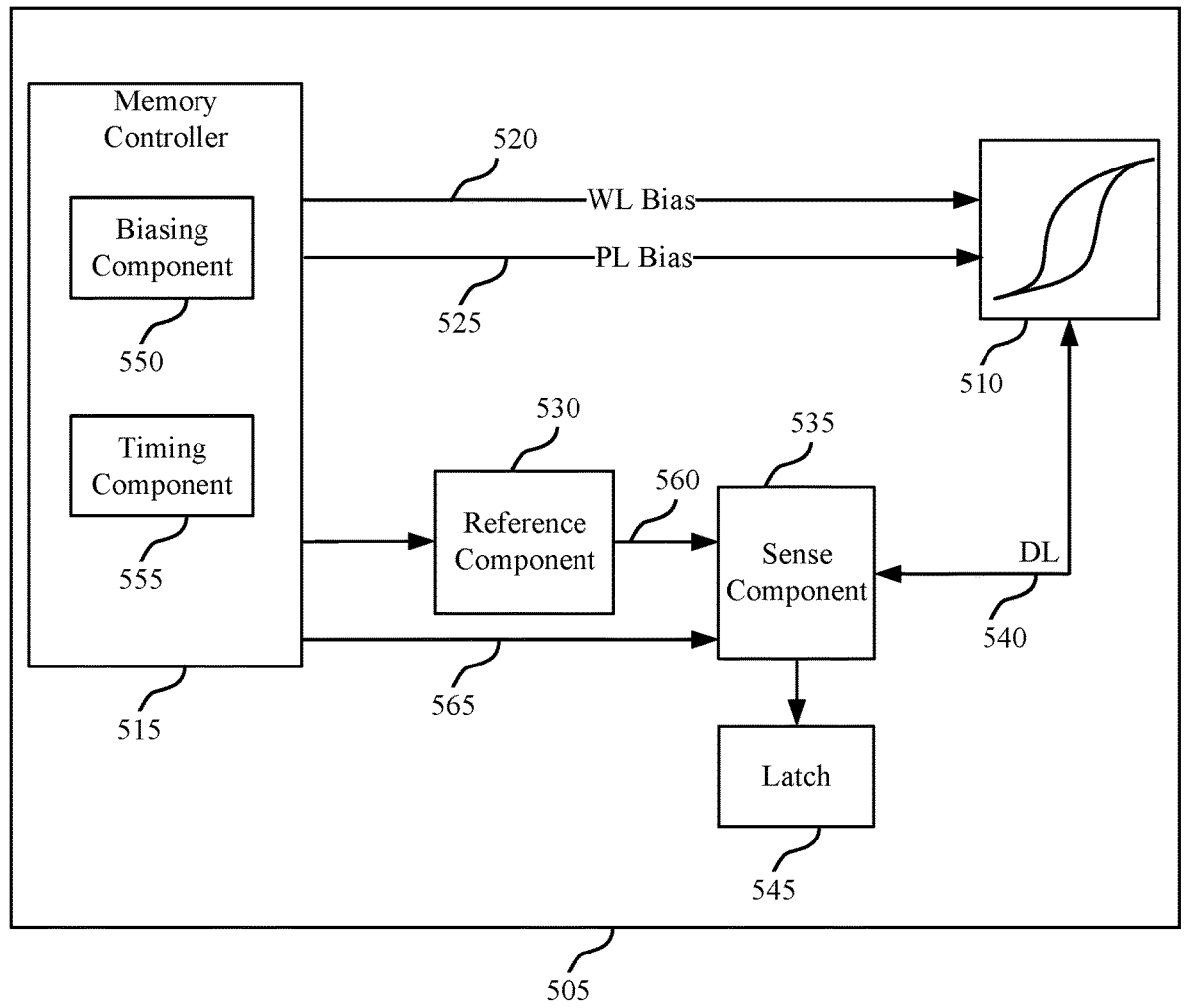
FIGS. 5 through 6 show block diagrams of a device that supports temperature updating for a memory device in accordance with examples of the present disclosure.

FIG. 5 shows a block diagram 500 of a memory array 505 that supports temperature updating for a memory device in accordance with various examples of the present disclosure. Memory array 505 may be referred to as an electronic memory apparatus, and may be an example of a component of a memory array 100 as described with reference to FIG. 1.

Memory array 505 may include one or more memory cells 510, a memory controller 515, a word line 520, a plate line 525, a reference component 530, a sense component 535, a digit line 540, and a latch 545. These components may be in electronic communication with each other and may perform one or more of the functions described herein. In some cases, memory controller 515 may include biasing component 550 and timing component 555.

Memory controller 515 may be in electronic communication with word line 520, digit line 540, sense component 535, and plate line 525, which may be examples of word line 110, digit line 115, sense component 125, and plate line 210 described with reference to FIGS. 1, and 2. Memory array 505 may also include reference component 530 and latch 545. The components of memory array 505 may be in electronic communication with each other and may perform examples of the functions described with reference to FIGS. 1 through 4. In some cases, reference component 530, sense component 535, and latch 545 may be components of memory controller 515.

In some examples, digit line 540 is in electronic communication with sense component 535 and a ferroelectric capacitor of ferroelectric memory cells 510. A ferroelectric memory cell 510 may be writable with a logic state (e.g., a first or second logic state). Word line 520 may be in electronic communication with memory controller 515 and a selection component of ferroelectric memory cell 510. Plate line 525 may be in electronic communication with memory controller 515 and a plate of the ferroelectric capacitor of ferroelectric memory cell 510. Sense component 535 may be in electronic communication with memory controller 515, digit line 540, latch 545, and reference line 560. Reference component 530 may be in electronic communication with memory controller 515 and reference line 560. Sense control line 565 may be in electronic communication with sense component 535 and memory controller 515. These components may also be in electronic communication with other components, both inside and outside of memory array 505, in addition to components not listed above, via other components, connections, or busses.

Memory controller 515 may be configured to activate word line 520, plate line 525, or digit line 540 by applying voltages to those various nodes. For example, biasing component 550 may be configured to apply a voltage to operate memory cell 510 to read or write memory cell 510 as described above. In some cases, memory controller 515 may include a row decoder, column decoder, or both, as described with reference to FIG. 1. This may enable memory controller 515 to access one or more memory cells 105. Biasing component 550 may also provide or apply voltage to reference component 530 in order to generate a reference signal for sense component 535. Additionally, biasing component 550 may provide or apply voltage for the operation of sense component 535.

In some cases, memory controller 515 may perform its operations using timing component 555. For example, timing component 555 may control the timing of the various word line selections or plate biasing, including timing for switching and voltage application to perform the memory functions, such as reading and writing, discussed herein. In some cases, timing component 555 may control the operations of biasing component 550.

Reference component 530 may include various components to generate a reference signal for sense component 535. Reference component 530 may include circuitry configured to produce a reference signal. In some cases, reference component 530 may be implemented using other ferroelectric memory cells 105. Sense component 535 may compare a signal from memory cell 510 (through digit line 540) with a reference signal from reference component 530. In some cases, sense component 535 may include a temperature sensor 255 such as described with reference to FIG. 2. In some applications, temperature sensor 255 may also be, be part of, or include a temperature sampling component. In some examples, temperature sensor 255 and the related temperature sampling component may be present as a separate component from sense component 535. Upon determining the logic state, the sense component may then store the output in latch 545, where it may be used in accordance with the operations of an electronic device that memory array 505 is a part. Sense component 535 may include a sense amplifier in electronic communication with the latch and the ferroelectric memory cell.

Memory controller 515 may be an example of the temperature manager 715 described with reference to FIG. 7. Memory controller 515 may operate a memory array according to a timing cycle that includes a first interval for performing a first type of operation and a second interval for performing a second type of operation, where a duration of the first interval is greater than a duration of the second type of interval, sample a temperature related to a temperature of at least a portion of the memory array during an interval of the second type, reconfigure the memory array based on a sampled temperature during the interval of the second type, and perform the first type of operation on a reconfigured memory array during an interval of the first type. In some examples, during the first interval, one or more memory operations (e.g., access operations) related to a memory array or a memory cell may be performed. For example, a read operation related to the memory array or a memory cell may be performed, a write operation related to the memory array or a memory cell may be performed, an operation activating one or more components (e.g., activating sense component) related to the memory array or a memory cell may be performed, or a precharging operation related to a component of the memory array may be performed. In some cases, based on a refresh operation, the memory cell may be refreshed during the second interval. In some cases, during part or an entire second interval (e.g., an interval potentially set aside for a refresh operation) a temperature related to a temperature of at least a portion of the memory array may be sampled, the memory array may be reconfigured based on the sampled temperature during the interval (and/or other intervals), other operations may be performed, or some combination. In some applications, the interval may be set aside for a refresh operation and used for temperature sampling. Memory array 100 may be sampled periodically (e.g., without limitation of every 8, 16, or 32 refresh intervals). In some cases, after reconfiguring of the memory array (or a memory cell and/or another component), a first type of operation (e.g., an access operation) may be performed on the reconfigured memory array during a subsequent interval (e.g., an interval of the first type).

Figure 6:
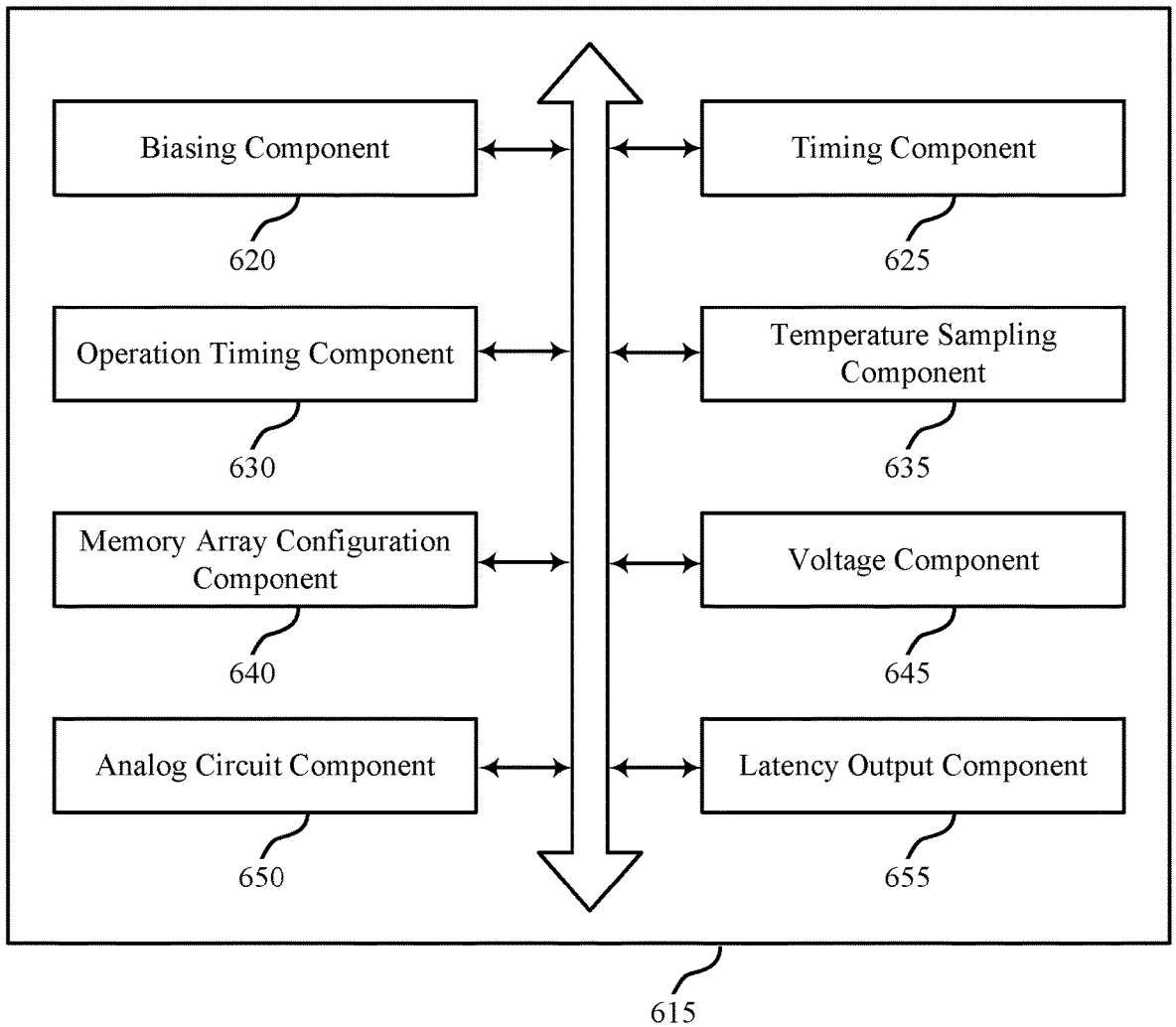

FIG. 6 shows a block diagram 600 of a temperature manager 615 that supports temperature updating for a memory device in accordance with various examples of the present disclosure. The temperature manager 615 may be an example of examples of a temperature manager 715 described with reference to FIGS. 4, 5, and 7. The temperature manager 615 may include biasing component 620, timing component 625, operation timing component 630, temperature sampling component 635, memory array configuration component 640, voltage component 645, analog circuit component 650, and latency output component 655. Each of these modules may communicate, directly or indirectly, with one another (e.g., via one or more buses).

Operation timing component 630 may operate a memory array according to a timing cycle that includes a first interval for performing a first type of operation and a second interval for performing a second type of operation, where a duration of the first interval is greater than a duration of the second interval and perform the first type of operation on a reconfigured memory array during an interval of the first type. In some cases, the first type of operation includes at least one of an accessing a cell of the memory array, reading from a cell of the memory array, writing to a cell of the memory array, activating a sensing component, precharging a component of the memory array, or any combination thereof. In some cases, the second type of operation includes refreshing a cell of the memory array or sampling the temperature of at least the portion of the memory array. In some cases, the first type of operation is prohibited during intervals of the second type.

Temperature sampling component 635 may sample a temperature related to a temperature of at least a portion of the memory array during an interval of the second type and resample the temperature of the memory cell and/or of the portion of the memory array after sampling. In some cases, the controller may isolate one or more portions of the memory array 100 to resample a temperature from at least one portion of the memory array 100.

Memory array configuration component 640 may reconfigure the memory array based on a sampled temperature during the interval of the second type, reconfigure the memory array based on receiving a command from a controller, and reconfigure the memory array based on periodically resampling the memory array.

Voltage component 645 may adjust the voltage of the memory array based on comparing the sampled temperature to a predetermined value and engaging a charge pump to increase current flow to a regulator based on the adjusted voltage. In some cases, reconfiguring the memory array includes adjusting a voltage associated with the memory array based on the sampled temperature and evaluating an adjusted voltage of the reconfigured memory array, where the adjusted voltage is less than a supply voltage.

Analog circuit component 650 may access the look-up table with different entry values based on the sampled temperature and adjust a digital-to-analog converter (DAC) value based on the sampled temperature and the value. In some cases, reconfiguring the memory array includes updating an analog circuit. In some cases, updating the analog circuit includes accessing a value in a look-up table.

Latency output component 655 may receive a value from the mode register and perform an operation associated with the memory array based on the temperature update command and the value from the mode register. In some cases, reconfiguring the memory array further includes outputting latency information to a controller via a mode register. In some cases, outputting latency information includes initiating a temperature update command.

Figure 7:
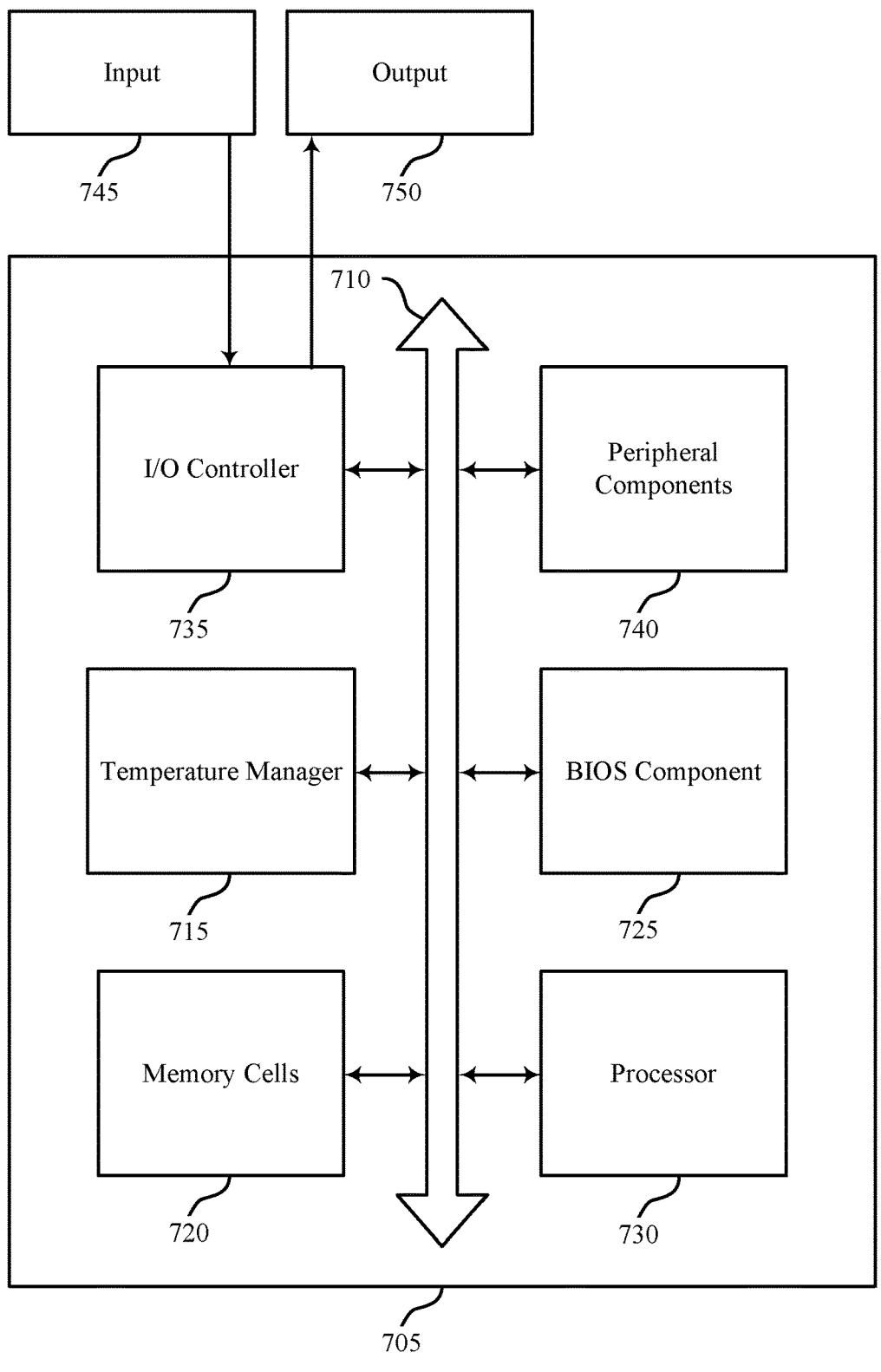
FIG. 7 illustrates a block diagram of a system including a memory array that supports temperature updating for a memory device in accordance with examples of the present disclosure.

FIG. 7 shows a diagram of a system 700 including a device 705 that supports temperature updating for a memory device in accordance with various examples of the present disclosure. Device 705 may include the components of memory array 100 as described above, e.g., with reference to FIG. 1. Device 705 may include components for bi-directional voice and data communications including components for transmitting and receiving communications, including temperature manager 715, memory cells 720, basic input/output system (BIOS) component 725, processor 730, I/O controller 735, and peripheral components 740. These components may be in electronic communication via one or more busses (e.g., bus 710).

Memory cells 720 may store information (i.e., in the form of a logical state) as described herein. BIOS component 725 be a software component that includes BIOS operated as firmware, which may initialize and run various hardware components. BIOS component 725 may also manage data flow between a processor and various other components, e.g., peripheral components, input/output control component, etc. BIOS component 725 may include a program or software stored in read only memory (ROM), flash memory, or any other non-volatile memory.

Processor 730 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 730 may be configured to operate a memory array using a memory controller. In other cases, a memory controller may be integrated into processor 730. Processor 730 may be configured to execute computer-readable instructions stored in a memory to perform various functions (e.g., functions or tasks supporting temperature updates for memory devices).

I/O controller 735 may manage input and output signals for device 705. I/O controller 735 may also manage peripherals not integrated into device 705. In some cases, I/O controller 735 may represent a physical connection or port to an external peripheral. In some cases, I/O controller 735 may utilize an operating system such as iOS®, ANDROID®, MS-DOS®, MS-WINDOWS®, OS/2®, UNIX®, LINUX®, or another known operating system.

Peripheral components 740 may include any input or output device, or an interface for such devices. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots.

Input 745 may represent a device or signal external to device 705 that provides input to device 705 or its components. This may include a user interface or an interface with or between other devices. In some cases, input 745 may be managed by I/O controller 735, and may interact with device 705 via a peripheral component 740.

Output 750 may also represent a device or signal external to device 705 configured to receive output from device 705 or any of its components. Examples of output 750 may include a display, audio speakers, a printing device, another processor or printed circuit board, etc. In some cases, output 750 may be a peripheral element that interfaces with device 705 via peripheral component(s) 740. In some cases, output 750 may be managed by I/O controller 735

The components of device 705 may include circuitry designed to carry out their functions. This may include various circuit elements, for example, conductive lines, transistors, capacitors, inductors, resistors, amplifiers, or other active or inactive elements, configured to carry out the functions described herein. Device 705 may be a computer, a server, a laptop computer, a notebook computer, a tablet computer, a mobile phone, a wearable electronic device, a personal electronic device, or the like. Or device 705 may be a portion, component, element, or aspect of such a device.

Figure 8:
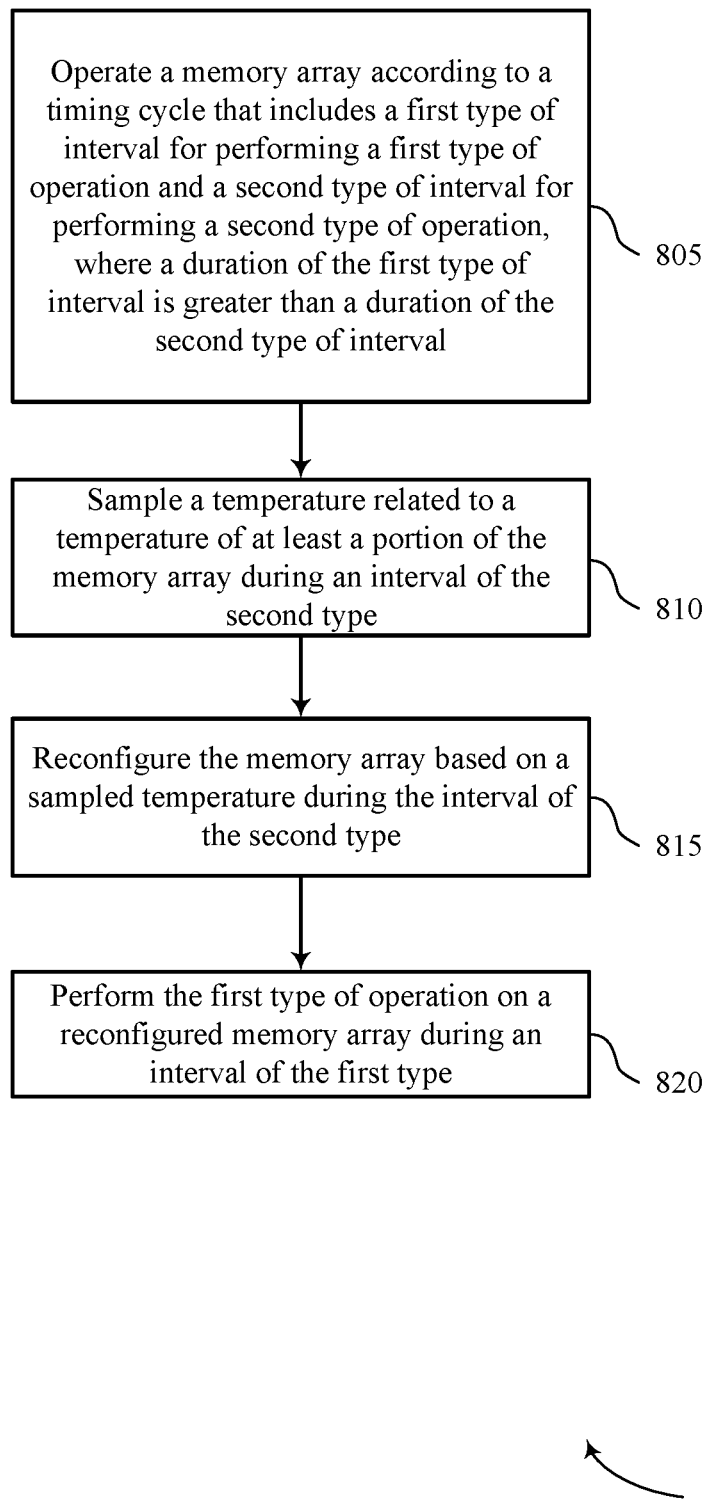
FIGS. 8 through 9 illustrate methods for temperature updating for a memory device in accordance with examples of the present disclosure.

FIG. 8 shows a flowchart illustrating a method 800 for temperature updating for a memory device in accordance with various examples of the present disclosure. The operations of method 800 may be implemented by a memory array 100 or its components as described herein. For example, the operations of method 800 may be performed by a temperature manager as described with reference to FIGS. 5 through 7. In some examples, a memory array 100 may execute a set of codes to control the functional elements of the device to perform the functions described below. Additionally or alternatively, the memory array 100 may perform examples the functions described below using special-purpose hardware.

At block 805 the method may include operating a memory array according to a timing cycle that includes a first interval for performing a first type of operation and a second interval for performing a second type of operation, where a duration of the first interval is greater than a duration of the second type of interval. The operations of block 805 may be performed according to the methods described with reference to FIGS. 1 and 4. In some cases, the first type of operation includes at least one of an accessing a cell of the memory array 100, reading from a cell of the memory array 100, writing to a cell of the memory array 100, activating a sensing component, precharging a component of the memory array 100, or any combination thereof. In some cases, the second type of operation includes refreshing a cell of the memory array 100 or sampling the temperature of at least the portion of the memory array 100. In certain examples, examples of the operations of block 805 may be performed by a operation timing component as described with reference to FIGS. 5 through 7.

At block 810 the method may include sampling a temperature related to a temperature of at least a portion of the memory array during an interval of the second type. In some cases, the sampling of the temperature includes using a temperature sensor to sample a temperature of at least a portion of a memory array or a memory apparatus. The operations of block 810 may be performed according to the methods described with reference to FIGS. 1 and 4. In certain examples, examples of the operations of block 810 may be performed by a temperature sampling component as described with reference to FIGS. 5 through 7.

At block 815 the method may include reconfiguring the memory array based at least in part on a sampled temperature during the interval of the second type. In some cases, reconfiguring the memory array includes adjusting a voltage associated with the memory array based at least in part on the sampled temperature. Reconfiguring the memory array may, in some cases, include evaluating an adjusted voltage of the reconfigured memory array, where the adjusted voltage is less than the a supply voltage and engaging a charge pump to increase current flow to a regulator based at least in part on the adjusted voltage. In some applications, reconfiguring the memory array includes updating an analog circuit. Reconfiguring the memory array, in some cases, may also include outputting latency information to a controller via a mode register. The operations of block 815 may be performed according to the methods described with reference to FIGS. 1 and 4. In certain examples, examples of the operations of block 815 may be performed by a memory array configuration component as described with reference to FIGS. 5 through 7.

At block 820 the method may include performing the first type of operation on a reconfigured memory array during an interval of the first type. The operations of block 820 may be performed according to the methods described with reference to FIGS. 1 and 4. In certain examples, examples of the operations of block 820 may be performed by a operation timing component as described with reference to FIGS. 5 through 7.

Figure 9:
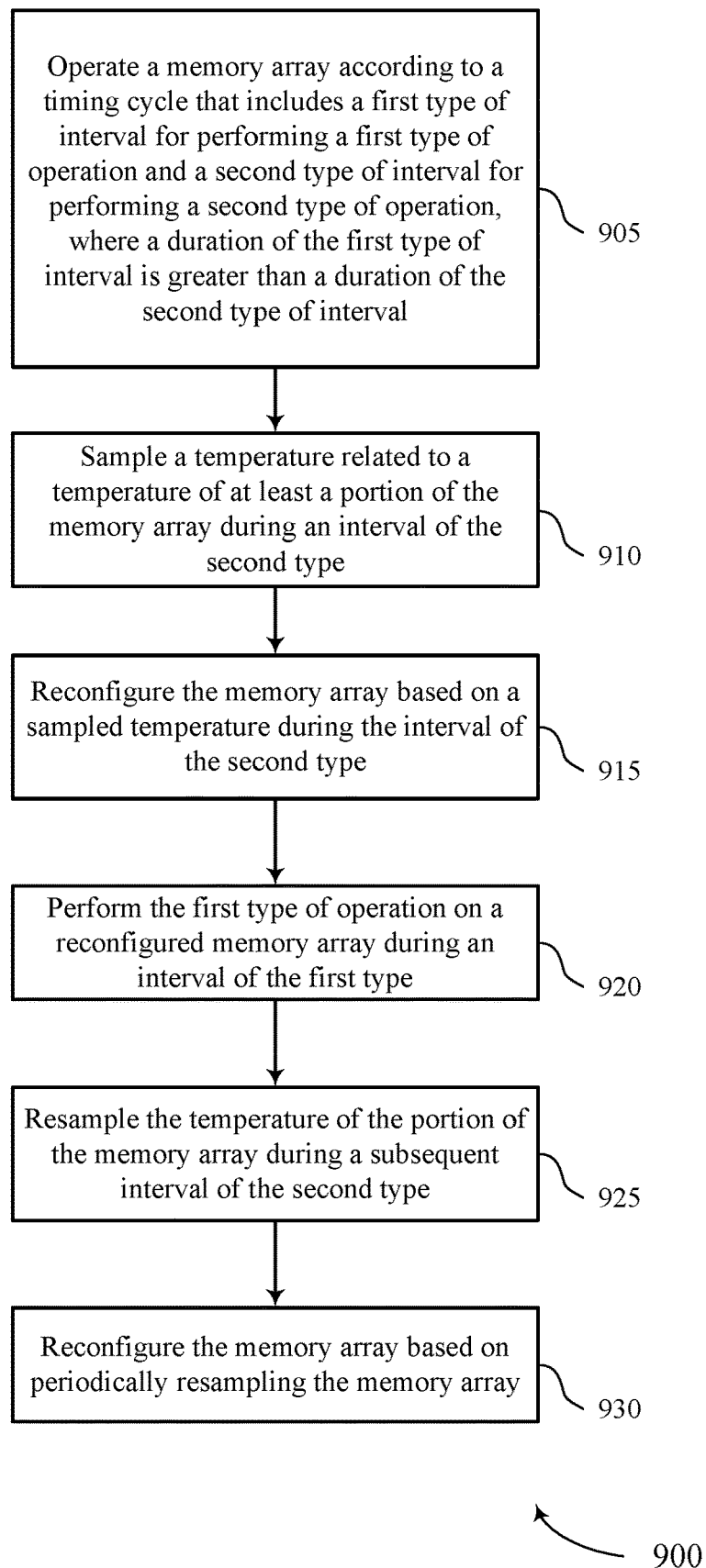

FIG. 9 shows a flowchart illustrating a method 900 for temperature updating for a memory device in accordance with various examples of the present disclosure. The operations of method 900 may be implemented by a memory array 100 or its components as described herein. For example, the operations of method 900 may be performed by a temperature manager as described with reference to FIGS. 5 through 7. In some examples, a memory array 100 may execute a set of codes to control the functional elements of the device to perform the functions described below. Additionally or alternatively, the memory array 100 may perform examples the functions described below using special-purpose hardware.

At block 905 the memory array 100 may operate a memory array according to a timing cycle that includes a first interval for performing a first type of operation and a second interval for performing a second type of operation, where a duration of the first interval is greater than a duration of the second type of interval. The operations of block 905 may be performed according to the methods described with reference to FIGS. 1 and 4. In some cases, the first type of operation includes at least one of an accessing a cell of the memory array 100, reading from a cell of the memory array 100, writing to a cell of the memory array 100, activating a sensing component, precharging a component of the memory array 100, or any combination thereof. In some cases, the second type of operation includes refreshing a cell of the memory array 100 or sampling the temperature of at least the portion of the memory array 100. In certain examples, examples of the operations of block 905 may be performed by a operation timing component as described with reference to FIGS. 5 through 7.

At block 910 the memory array 100 may sample a temperature related to a temperature of at least a portion of the memory array during an interval of the second type. In some cases, the sampling of the temperature includes using a temperature sensor to sample a temperature of at least a portion of a memory array or a memory apparatus. The operations of block 910 may be performed according to the methods described with reference to FIGS. 1 and 4. In certain examples, examples of the operations of block 910 may be performed by a temperature sampling component as described with reference to FIGS. 5 through 7.

At block 915 the memory array 100 may reconfigure the memory array based at least in part on a sampled temperature during the interval of the second type. In some cases, reconfiguring the memory array includes adjusting a voltage associated with the memory array based at least in part on the sampled temperature. Reconfiguring the memory array, in some cases, includes evaluating an adjusted voltage of the reconfigured memory array, where the adjusted voltage is less than the a supply voltage and engaging a charge pump to increase current flow to a regulator based at least in part on the adjusted voltage. In some applications, reconfiguring the memory array includes updating an analog circuit. Reconfiguring the memory array, in some cases, may also include outputting latency information to a controller via a mode register. The operations of block 915 may be performed according to the methods described with reference to FIGS. 1 and 4. In certain examples, examples of the operations of block 915 may be performed by a memory array configuration component as described with reference to FIGS. 5 through 7.

At block 920 the memory array 100 may perform the first type of operation on a reconfigured memory array during an interval of the first type. The operations of block 920 may be performed according to the methods described with reference to FIGS. 1 and 4. In certain examples, examples of the operations of block 920 may be performed by a operation timing component as described with reference to FIGS. 5 through 7.

At block 925 the memory array 100 may resample the temperature of the portion of the memory array after the sampling. The operations of block 925 may be performed according to the methods described with reference to FIGS. 1 and 4. In certain examples, examples of the operations of block 925 may be performed by a temperature sampling component as described with reference to FIGS. 5 through 7.

At block 930 the memory array 100 may reconfigure the memory array based at least in part on periodically resampling the memory array. In some cases, resampling the temperature may be periodically repeated at the Nth interval of the second type, where N is an integer number. (e.g., without limitation, 8, 16, 32, etc.) The operations of block 930 may be performed according to the methods described with reference to FIGS. 1 and 4. In certain examples, examples of the operations of block 930 may be performed by a memory array configuration component as described with reference to FIGS. 5 through 7.

It should be noted that the methods described above describe possible implementations, and that the operations and the steps may be rearranged or otherwise modified and that other implementations are possible. Furthermore, examples from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly connected with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The term "electronic communication" refers to a relationship between components that supports electron flow between the components. This may include a direct connection between components or may include intermediate components. Components in electronic communication may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication regardless of the state of the switch (i.e., open or closed). A switch, for example, that is in contact with other components may facilitate electronic communication between the components.

The term "isolated" refers to a relationship between components in which electrons are not presently capable of flowing between them; components are isolated from each other if there is an open circuit between them. For example, two components physically connected by a switch may be isolated from each other when the switch is open.

As used herein, the term "shorting" refers to a relationship between components in which a conductive path is established between the components via the activation of a single intermediary component between the two components in question. For example, a first component shorted to a second component may exchange electrons with the second component when a switch between the two components is closed. Thus, shorting may be a dynamic operation that enables the flow of charge between components (or lines) that are in electronic communication.

The devices discussed herein, including memory array 100, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A transistor or transistors discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   operating a memory array according to a timing cycle that comprises consecutively alternating access intervals and refresh intervals, wherein operating the memory array comprises:
   accessing a portion of the memory array during a first access interval;
   sampling a temperature of a portion of the memory array during a first refresh interval that follows the first access interval;
   configuring the memory array, during the first refresh interval, after sampling the temperature, wherein configuring the memory array comprises updating an analog circuit, wherein updating the analog circuit comprises:
   identifying a temperature value;
   updating a stored value based at least in part on the sampled temperature being different than the temperature value in a look-up table; and
   adjusting a digital-to-analog converter (DAC) value based at least in part on updating the stored value; and
   accessing a portion of the reconfigured memory array during a second access interval that follows the first refresh interval.

2. The method of claim 1, further comprising:
   sampling a temperature of the portion of the memory array during non-consecutive refresh intervals; and
   configuring the memory array based at least in part on sampling the temperature during the non-consecutive refresh intervals.

3. The method of claim 1, further comprising:
   comparing the sampled temperature to a reference temperature; and
   adjusting, during the first refresh interval, a voltage applied to a regulator during the first refresh interval based at least in part on the comparing the sampled temperature to the reference temperature.

4. The method of claim 3, further comprising:
   determining that the sampled temperature is lower than the reference temperature, wherein the voltage applied to the regulator is increased based at least in part on the sampled temperature being lower than the reference temperature.

5. The method of claim 1, wherein configuring the memory array further comprises:
   identifying latency information associated with an operation of the memory array, wherein the latency information comprises a duration of the first access interval, the first refresh interval, the second access interval, or a combination thereof; and
   outputting the latency information to a controller via a mode register, wherein the latency information is based at least in part on the sampled temperature.

6. The method of claim 1, wherein operating the memory array during an access interval comprises:
   performing a read operation on one or more memory cells of the memory array;
   performing a write operation on one or more memory cells of the memory array; and
   activating one or more sense components of the memory array or precharging one or more components of the memory array.

7. The method of claim 1, further comprising:
   receiving, from a controller, a command during a refresh interval of the timing cycle, wherein the memory array is reconfigured based at least in part on receiving the command.

8. The method of claim 1, further comprising:
   accessing a portion of the memory array during a third access interval;
   sampling a temperature of a portion of the memory array during a second refresh interval that follows the third access interval;
   configuring the memory array, during the second refresh interval, based at least in part on sampling the temperature during the second refresh interval; and
   accessing a portion of the configured memory array during a fourth access interval that follows the second refresh interval.

9. The method of claim 1, wherein the access intervals comprise a different duration than the refresh intervals.

10. The method of claim 1, wherein the timing cycle comprises at least one more access interval than the refresh intervals.

11. The method of claim 1, wherein the access intervals and the refresh intervals are mutually exclusive in time.

12. A method, comprising:
    operating a memory array according to a timing cycle that comprises consecutively alternating access intervals and refresh intervals, wherein operating the memory array comprises:
    accessing a portion of the memory array during a first access interval;
    sampling a temperature of a portion of the memory array during a first refresh interval that follows the first access interval;
    configuring the memory array, during the first refresh interval, after sampling the temperature, wherein configuring the memory array comprises:
    identifying a range of temperatures associated with the memory array;
    comparing the sampled temperature to the range of temperatures; and
    activating a charge pump coupled with the memory array to increase current flow to a portion of the memory array based at least in part on comparing the sampled temperature to the range of temperatures; and
    accessing a portion of the reconfigured memory array during a second access interval that follows the first refresh interval.

13. The method of claim 12, further comprising:
    identifying a relevant temperature of the range of temperatures based at least in part on the sampled temperature, wherein the charge pump is activated based at least in part on the sampled temperature being lower than the relevant temperature.

14. An apparatus, comprising:
    a memory array that comprises a memory cell, the memory array configured to operate according to a timing cycle that includes consecutively alternating access intervals and refresh intervals;

a temperature sensor coupled with the memory cell that is configured to sample a temperature of the memory cell during a first refresh interval that follows a first access interval, wherein the memory array is reconfigured, during the first refresh interval, after sampling the temperature, wherein reconfiguring the memory array comprises updating an analog circuit, wherein updating the analog circuit comprises identifying a temperature value, updating a stored value based at least in part on the sampled temperature being different than the temperature value in a look-up table, and adjusting a digital-to-analog converter (DAC) value based at least in part on updating the stored value; and a latch coupled with the temperature sensor that is configured to store a temperature associated with the temperature sensor for reconfiguring the memory array.

15. The apparatus of claim 14, further comprising:
a voltage source coupled with the memory cell that is configured to apply a voltage to the memory cell during the access intervals.

16. The apparatus of claim 15,
wherein the analog circuit coupled with the latch is configured to output the DAC value based at least in part on the sampled temperature of the memory cell, wherein the voltage applied to the memory cell is adjusted based at least in part on the DAC value.

17. The apparatus of claim 14, further comprising:
a mode register coupled with the temperature sensor; and
a latency output component coupled with the mode register that is configured to output latency information during one or more access intervals and refresh intervals, wherein a duration of the access intervals, the refresh intervals, or both is adjusted based at least in part on the latency information.

18. An apparatus, comprising:
a memory array that comprises at least one memory cell, the memory array configured to operate according to a timing cycle that comprises consecutively alternating access intervals and refresh intervals; and a controller coupled with the memory array, wherein the controller is operable to:
initiate accessing a portion of the memory array during a first access interval;
sample a temperature of a portion of the memory array during a first refresh interval that follows the first access interval;
configure the memory array during the first refresh interval after sampling the temperature, wherein configuring the memory array comprises:
identifying a range of temperatures associated with the memory array;
comparing the sampled temperature to the range of temperatures; and
activating a charge pump coupled with the memory array to increase current flow to a portion of the memory array based at least in part on comparing the sampled temperature to the range of temperatures; and
initiate accessing a portion of the configured memory array during a second access interval that follows the first refresh interval.

19. The apparatus of claim 18, wherein the controller is operable to:
initiate accessing a portion of the memory array during a third access interval;
sample a temperature of a portion of the memory array during a second refresh interval that follows the third access interval;
configure the memory array during the second refresh interval based at least in part on sampling the temperature during the second refresh interval; and
initiate accessing a portion of the configured memory array during a fourth access interval that follows the second refresh interval.

* * * * *